United States Patent [19]
Heilig

[11] Patent Number: 6,068,286
[45] Date of Patent: May 30, 2000

[54] GAS BAG MODULE FOR A VEHICLE OCCUPANT RESTRAINT SYSTEM

[75] Inventor: Alexander Heilig, Wissgoldingen, Germany

[73] Assignee: TRW Occupant Restraint Systems GmbH & Co. KG, Alfdorf, Germany

[21] Appl. No.: 09/207,217

[22] Filed: Dec. 8, 1998

[30] Foreign Application Priority Data

Dec. 8, 1997 [DE] Germany ............ 297 21 681 U

[51] Int. Cl.⁷ .................................................. B60R 21/20
[52] U.S. Cl. ...................................................... 280/728.3
[58] Field of Search ......................... 280/728.3, 728.1, 280/732

[56] References Cited

U.S. PATENT DOCUMENTS 5,375,876  12/1994  Bauer et al. .................. 280/728.2
5,378,014  1/1995  Cooper ........................ 280/728.2

Primary Examiner—Brian L. Johnson
Assistant Examiner—Faye M. Fleming
Attorney, Agent, or Firm—Tarolli, Sundheim, Covell, Tummino & Szabo L.L.P.

[57] ABSTRACT

A gas bag module comprises a housing, a gas bag arranged therein, a gas generator for filling the gas bag with compressed gas, and a cover formed by at least one cover part. The cover closes the housing and, after activation of the gas generator, is swiveled from a closed position into an opened position in order to allow the gas bag to emerge from the housing. The cover part, on opening, is swiveled around a swivel axis at least partially beneath a surface which is defined by an outer face of the cover part in the closed position.

13 Claims, 6 Drawing Sheets

GAS BAG MODULE FOR A VEHICLE OCCUPANT RESTRAINT SYSTEM

BACKGROUND OF THE INVENTION

The invention relates to a gas bag module for a vehicle occupant restraint system.

FIELD OF THE INVENTION

Such gas bag modules comprise a housing, a gas bag arranged therein, a gas generator for filling the gas bag with compressed gas, and a cover of at least one cover part which closes the housing and, after activation of the gas generator, is swivelled from a closed position into an opened position, in order to make possible an emergence of the gas bag from the housing.

In conventional gas bag modules, the cover is opened by the unfolding gas bag after activation of the gas generator. As the cover in such a gas bag module is connected by means of one of its outer edges with the housing or with a surrounding vehicle paneling, the cover is swivelled into the interior of the vehicle on opening. This results in the risk that the vehicle occupant is hit by the opening cover.

BRIEF DESCRIPTION OF THE INVENTION

The invention provides a gas bag module in which the risk for an occupant of being hit by the cover is eliminated. Such gas bag module comprises a housing, a gas bag arranged therein, a gas generator for filling the gas bag with compressed gas, and a cover formed by at least one cover part. The cover closes the housing and, after activation of the gas generator, is swiveled from a closed position into an opened position in order to allow the gas bag to emerge from the housing. The cover part, on opening, is swiveled around a swivel axis at least partially beneath a surface which is defined by an outer face of the cover part in the closed position. Depending on the configuration of the cover, the outer face of the cover part defines a flat or a curved surface. Depending on the arrangement of the swivel axis of the cover part, the latter is swiveled upon opening to a greater or lesser extent beneath the named surface, so that the risk for a vehicle occupant of being hit is at least reduced or is even eliminated. A risk of injury to a vehicle occupant no longer exists.

According to a preferred embodiment of the invention, provision is made that the cover part is connected with the housing by at least one swiveling part and that the swivel axis of the swiveling part, viewed in relation to the cover part, extends at the side of the housing at a distance from the cover part. The use of the swiveling part leads to a great structural freedom as regards the arrangement of the swivel axis for the cover part, so that the course of the swiveling movement can be defined in almost any desired manner.

In addition, provision is preferably made that the swivel axis extends at a distance from the cover part which, measured in a direction parallel to the swiveling direction, corresponds at least to the width of the cover part. In this construction, the cover part is swiveled so far away from the surface defined by it that it comes to lie completely behind this surface. Therefore, no risk for a vehicle occupant of being hit exists any more. The width of the cover part means here the distance between the two outer edges of the cover part which run parallel to the swivel axis of the cover part. Advantageous developments of the invention will be apparent from the sub-claims.

BRIEF DESCRIPTION OF THE DRAWINGS

The invention is described hereinbelow with the aid of two preferred embodiments, which are illustrated in the enclosed drawings. In these.

DETAILED DESCRIPTION OF THE INVENTION

Figure 1:
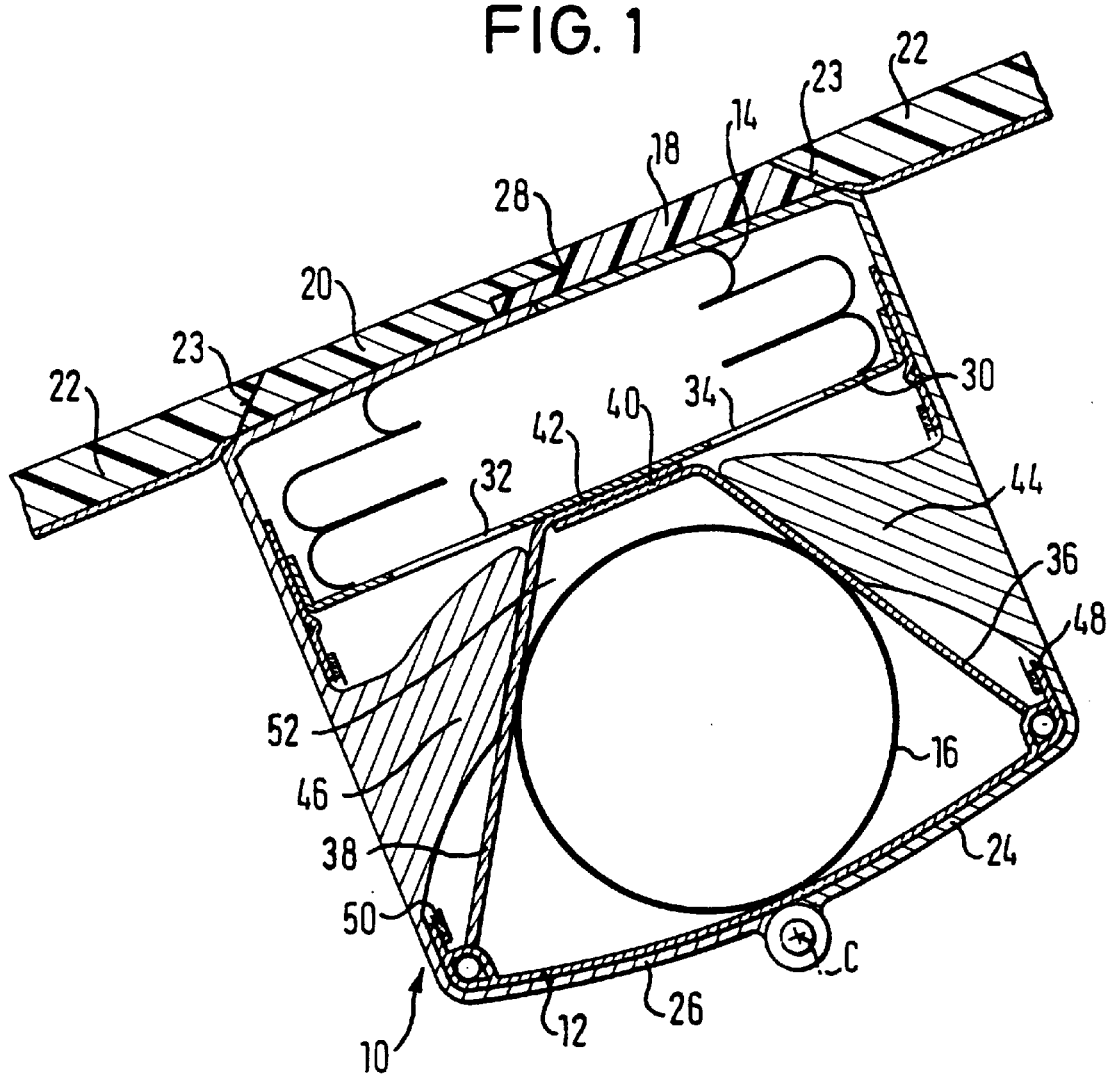
FIG. 1 shows a cross-sectional view of a gas bag module according to the invention, in accordance with a first embodiment and in the state of rest.

In FIG. 1, a gas bag module 10 according to a first embodiment of the invention is illustrated in a cross-sectional view. The gas bag module consists generally of a housing 12, a gas bag 14 arranged therein, a gas generator 16 for filling the gas bag 14 with compressed gas, and with a cover which consists of two cover parts 18, 20 and covers the gas bag 14. The gas bag module 10 is mounted in a vehicle such that the outer face of the cover parts 18, 20 terminates flush with, for example, an instrument panel 22. On the external longitudinal edges, each cover part 18, 20 is provided with a sloping face 23. The gas bag 14 can be unfolded by means of the compressed gas made available by the gas generator 16 after its activation in such a way that it positions itself in the interior of the vehicle and makes available a restraining effect for a vehicle occupant.

The cover parts 18, 20 are each articulated pivotably on the housing 12 by means of a swivel plate 24, 26, the swivel axis C extending in the central longitudinal plane of the gas bag module, parallel to its longitudinal axis along the base of the housing. Each swivel plate 24, 26 has a U-shape profile and extends, starting from the swivel axis C, along the base of the housing 12 on its outer face outwards to the lower longitudinal edge of the housing, starting from there along the side face of the housing upwards and then along the underside of the corresponding cover part 18, 20 towards the central longitudinal plane of the gas bag module. The corresponding cover part 18, 20 is firmly connected with the section of the swivel plate 24, 26 running on the upper face of the housing. The two cover parts 18, 20 lie against each other in the region of the central longitudinal plane of the gas bag module, a step-like contact section 28 being provided.

Inside the housing, a dividing wall 30 is arranged between the region in which the gas generator 16 is arranged and the region in which the folded gas bag 14 is arranged. This dividing wall is connected with the side walls of the housing and can be used to secure the gas bag 14 to the housing 12. The dividing wall 30 is provided with two passage openings 32, 34 which lead to the interior of the gas bag 14.

Slider plates 36, 38 are swivelably mounted on the base of the housing 12 along the side edges. These slider plates, in the state of rest, extend past the gas generator 16 towards the dividing wall 30, a slider element 40, 42 being provided at the end of each slider plate 36, 38 facing away from the base of the housing 12, which slider element 40, 42 is constructed in the manner of a plate and is angled with relation to the corresponding slider plate 36, 38 such that it extends parallel to the dividing 1 30. The base of the housing 12, the slider plates 36, 38 and the slider elements 40, 42 form together with the end faces of the housing a working chamber 52 which is closed off in the state of rest and in which the gas generator 16 is arranged.

A support element 44, 46 lies against the face of each slider plate 36, 38 facing away from the gas generator 16, which support element 44, 46 is constructed as a projection integrally formed with the corresponding swivel plate 24, 26. Each support element extends from the outer face of the housing, on which the swivel plates 24, 26 are arranged, into the interior of the housing through openings 48, 50 until in contact with the slider plates 36, 38 which are constructed in the side walls of the housing.

Figure 2:
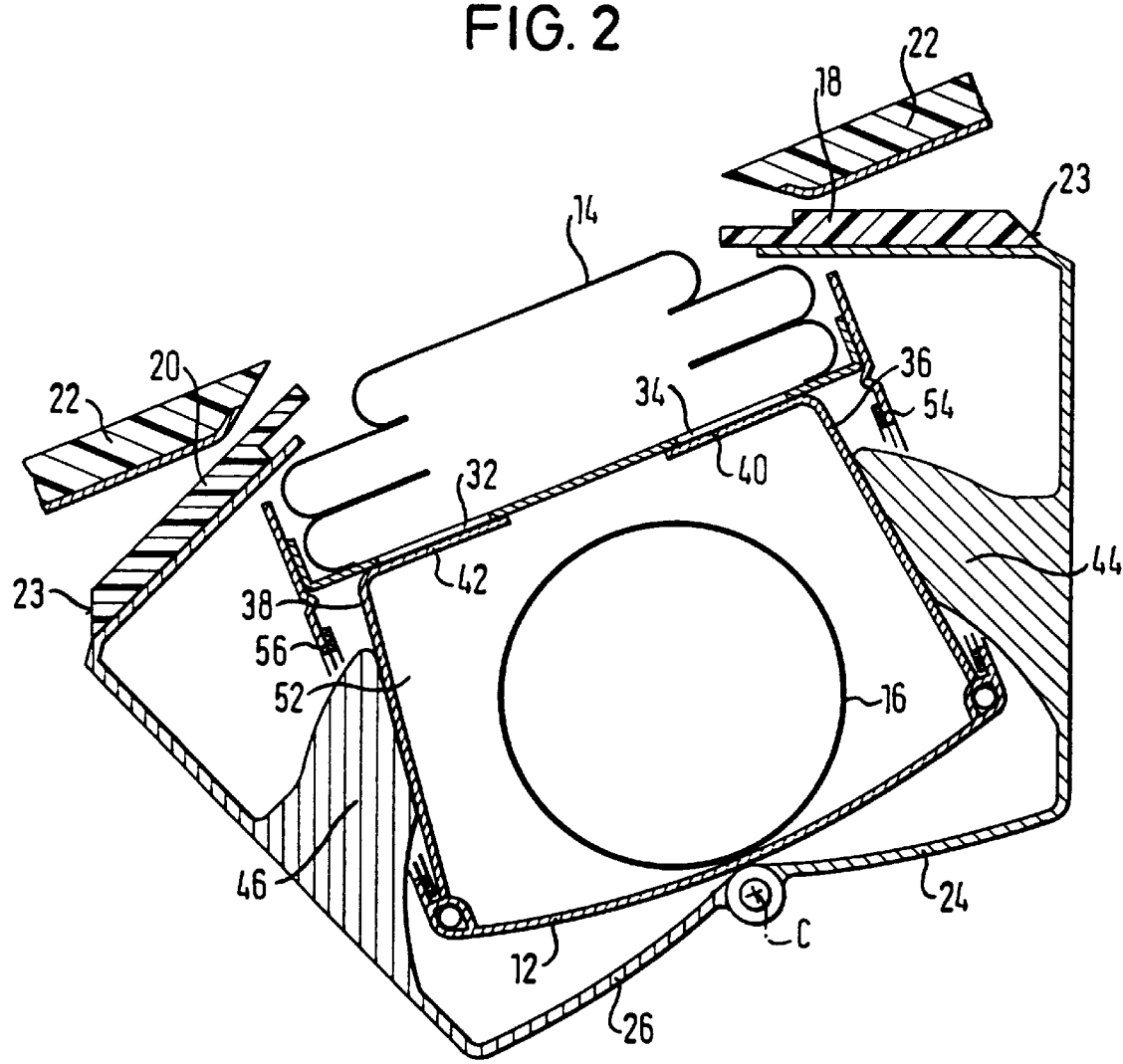
FIG. 2 shows in a cross-sectional view the gas bag module of FIG. 1 in a state after activation of the gas generator and before the unfolding of the gas bag.

If the gas generator 16 is activated starting from the state of rest, firstly the working chamber 52 formed by the base of the housing 12, the slider plates 36, 38 and the slider elements 40, 42 is set under pressure. In this state, it is not possible that the provided compressed gas enters the gas bag 14. The pressure occurring in the working chamber 52 causes the slider plates 36 and 38, respectively, to be swivelled outwards towards the side wall of the housing. In so doing, the slider elements 40, 42 slide in a tight manner on each other and on the dividing wall 30, so that the working chamber 52 continues to be closed. In FIG. 2, such a state is shown with outwardly swiveled slider plates 36, 38. The slider elements 40, 42 lie against the dividing wall 30 in the region of the passage openings 32, 34. On their swiveling movement outwards, the slider plates 36, 38 press the support elements 44, 46 outwards, the latter entraining the swivel plates 24, 26 and in so doing the cover parts 18, 20. Owing to the arrangement of the swivel axis C in the region of the base of the housing 12, the cover parts 18, 20 can retract beneath the instrument panel. This is facilitated by the sloping faces 23.

Figure 3:
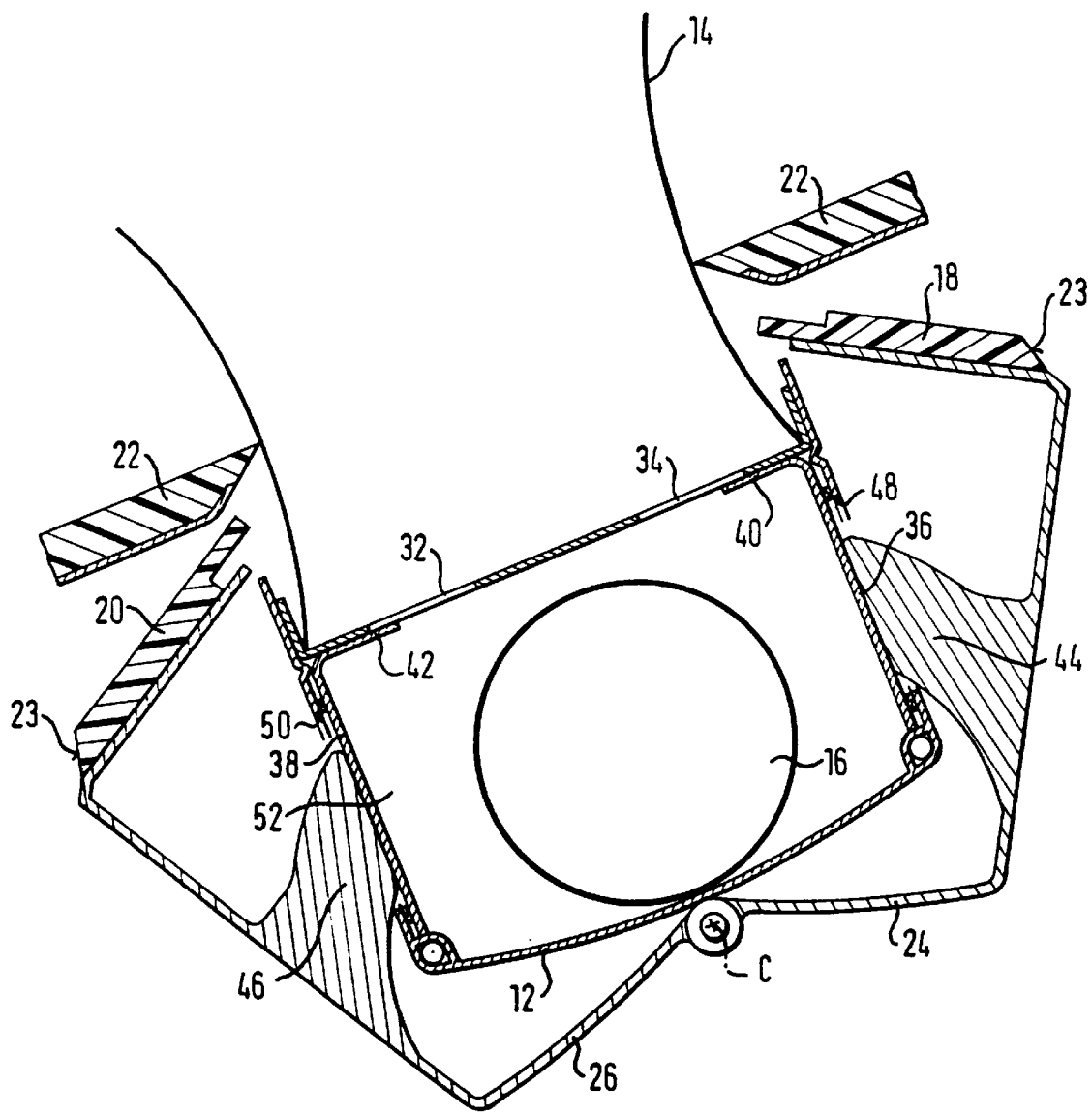
FIG. 3 shows the gas bag module of FIG. 1 in the state with unfolded gas bag.

In FIG. 3, the state of the gas bag module of FIG. 2 is shown, after the slider plates 36, 38 have been swiveled completely towards the side walls of the housing 10 under the action of the pressure produced in the working chamber 52. In this position, the slider elements 40, 42 have exposed the passage openings 32, 34 so that the compressed gas produced by the gas generator 16 can flow from the working chamber 52 into the gas bag 14 and can unfold it. For better sealing of the working chamber 52, seals 54, 56 are provided along the periphery of each opening 48, 50 in the side wall of the housing 12 (see also FIG. 4).

It is pointed out that owing to the special arrangement of the swivel axis C in the region of the base of the housing 12, an opening movement of the cover is achieved in which the latter does not move into the interior of the vehicle. A risk for a vehicle occupant to be hit therefore does not exist. Deviating from the embodiment shown, this effect can also be achieved if the swivel axis is not arranged on the base of the housing, but rather nearer towards the cover. The only important factor is that a swiveling radius is produced which is greater than the width of the cover measured along the opening direction. This ensures that the cover is swiveled principally toward the rear and away from the interior of the vehicle, when the cover is opened.

In is additionally pointed out that the effect according to the invention can also be achieved in gas bag modules in which the cover is not opened by means of the working chamber provided in the described embodiment, but rather in a conventional manner is pressed open under the action of the unfolding gas bag. In such a gas bag module, the gas bag which is acted upon by the compressed gas rests against the swivel plate which it then presses outwards. In addition, the gas bag rests in a known manner against the cover, which it likewise presses outwards. As a whole, the gas bag therefore rests against a greater surface than in conventional gas bag modules, so that to open the cover a greater force is made available by the gas bag which is acted upon by the compressed gas. This can be particularly useful when the swivel plate and the cover are firmly connected with each other, i.e. in particular when the transition from the cover, extending on the face of the housing facing the interior of the vehicle to the swivel plate extending along the side wall of the housing, is rigid. Then the unit formed by the swivel plate and the cover swivels in a particularly easy manner outwards as an L-shaped wing, because the gas bag resting against this unit produces a particularly great opening moment about the swivel axis.

Figure 4:
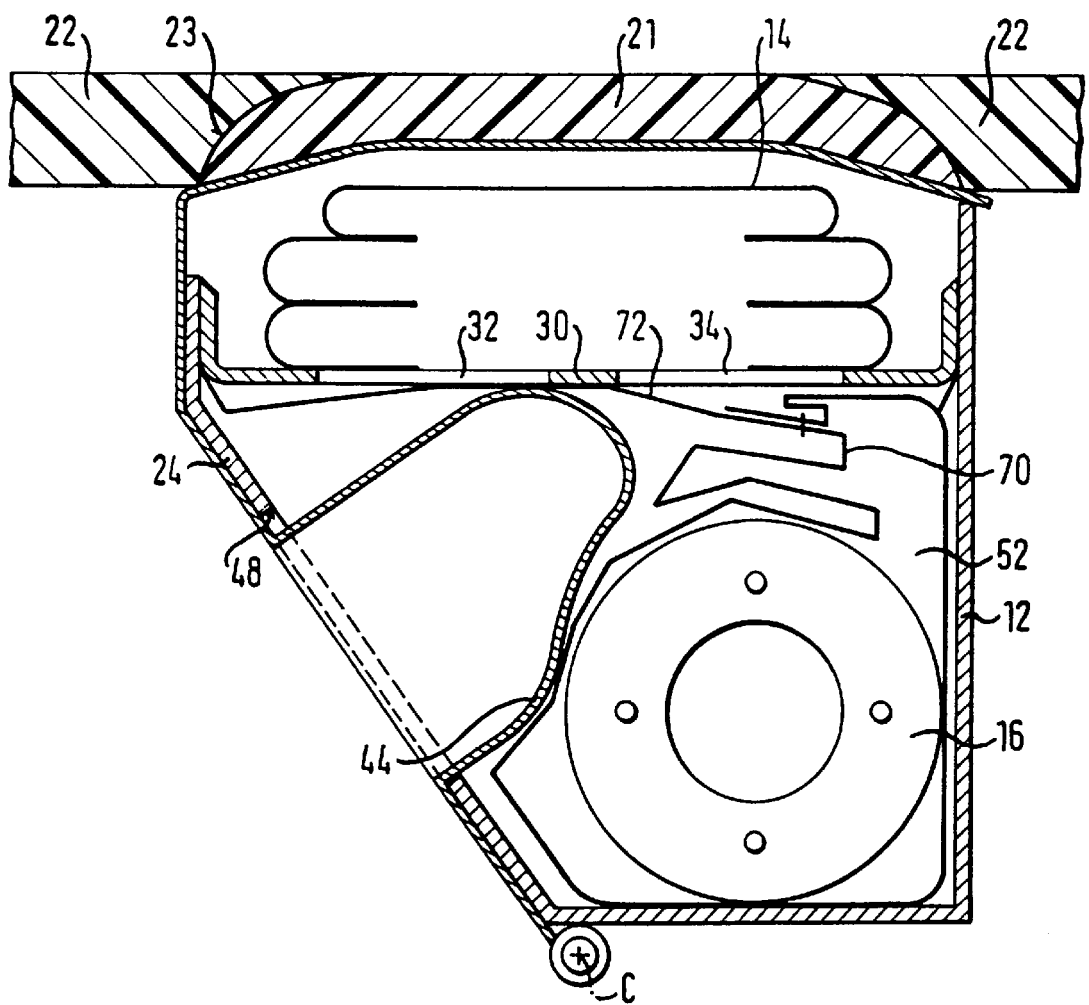
FIGS. 4 to 6 show in a cross-sectional view a gas bag module according to the invention, in accordance with a second embodiment in the state of rest, after the activation of the gas generator and with unfolded gas bag, respectively.
Figure 5:
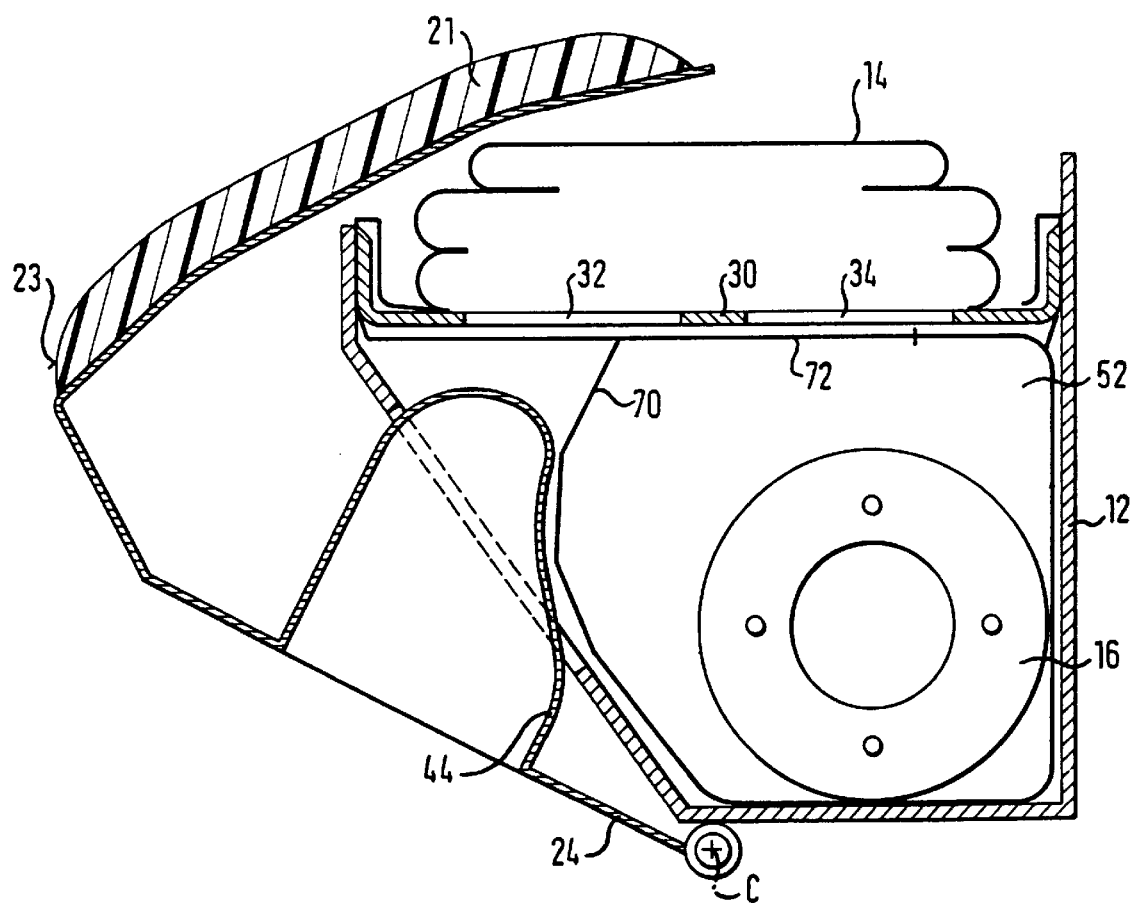
Figure 6:
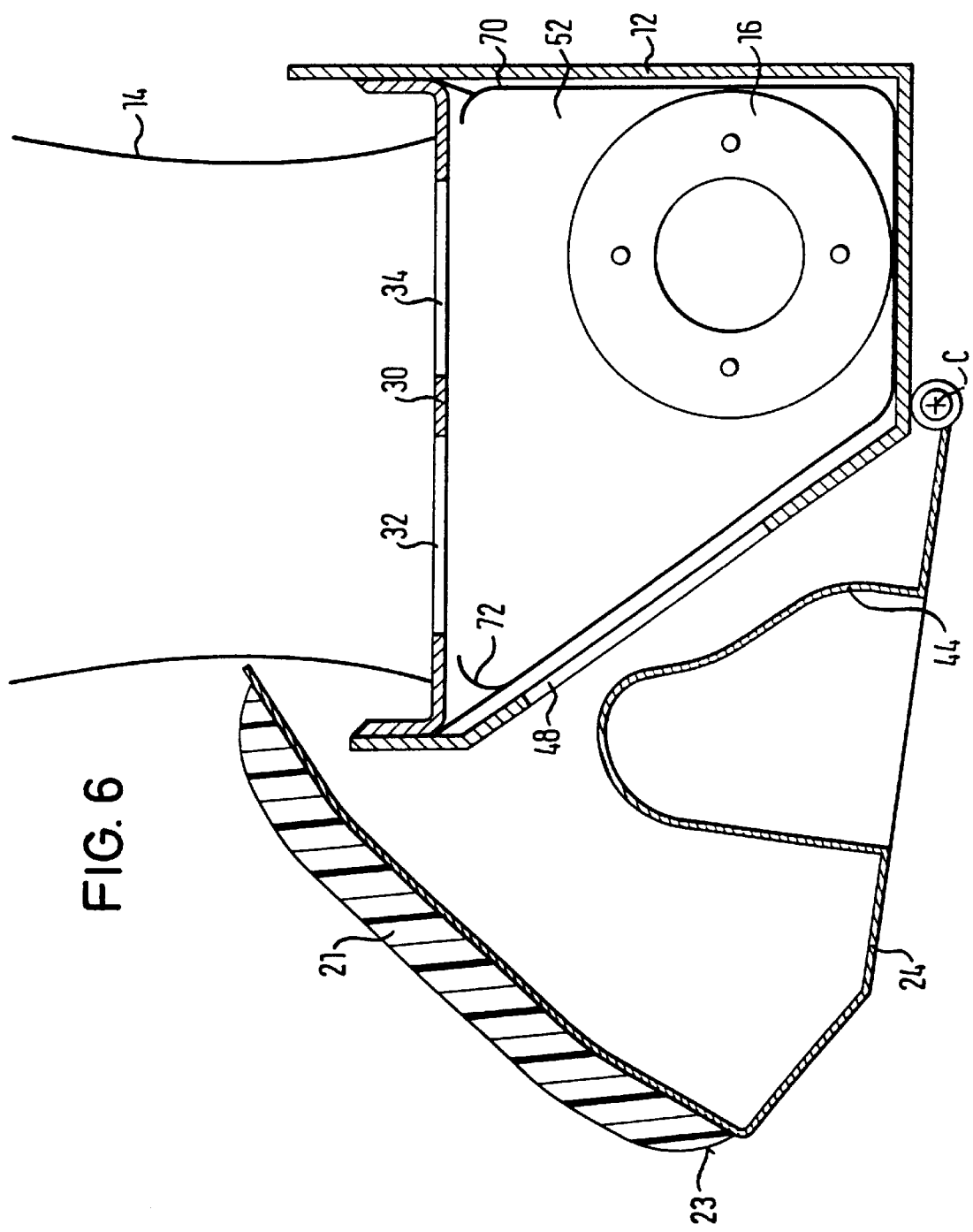

In FIGS. 4 to 6 a second embodiment is shown of the gas bag module according to the invention. As the construction and the mode of operation of the gas bag module according to the second embodiment largely correspond to those of the first embodiment, only the differences between the two embodiments will be entered into in detail hereinbelow. Structural elements of the second embodiment, which correspond to structural elements with the same function of the first embodiment, are designated by the same reference numbers.

In the gas bag module according to the second embodiment, the cover consists of a single cover part 21. For swivably arranging the latter on the housing 12, only a single swivel plate 24 is used. This swivel plate 24 is swivelable about a swivel axis C which is arranged in the central longitudinal plane of the housing 12 in the region of the base. The gas generator 16 is arranged on the right-hand side of the housing with respect to FIG. 4, and the support element 44, formed on the swivel plate 24 and projecting through the opening 48 into the interior of the housing, has on its face facing the gas generator 16 a contour adapted thereto. Inside the housing, a first and a second lateral fabric flap 70, 72 are provided, which together form a working chamber 52. After activation of the gas generator, this working chamber is acted upon by compressed gas and the swivel plate 24 is swiveled outwards due to the pressure acting on the support element 44. In so doing, the cover part 21 retracts beneath the instrument panel 22.

In FIG. 5, the gas bag module is shown in a state in which the cover part 21 is almost completely opened. In this state, the working chamber 52 formed by the first and the second fabric pieces 70, 72 is still closed off, so that the compressed gas provided by the gas generator 16 can not flow in through the passage openings 32, 34 into the gas bag 14 and unfold it.

If a predetermined pressure is exceeded inside the working chamber 52, the second fabric piece 72 is torn and the compressed gas can flow through the passage openings 32, 34 into the gas bag 14 and unfold it. The first fabric piece 70 seals off the opening 48 in the side wall of the housing 12, so that the compressed gas which is produced is fully available to fill the gas bag 14.

What is claimed is:

1. A gas bag module for a vehicle occupant restraint system, comprising a housing, a gas bag arranged therein, a gas generator for filling said gas bag with compressed gas, and a cover formed by at least one cover part, said cover closing said housing and, after activation of said gas generator, being swiveled from a closed position into an opened position in order to allow said gas bag to emerge from said housing, said cover part, on opening, being swiveled around a swivel axis at least partially beneath a surface which is defined by an outer face of said cover part in said closed position.

2. The gas bag module of claim 1, wherein said cover part is connected to said housing by at least one swiveling part having a swivel axis, said swivel axis, when viewed in relation to said cover part, extending at a side of said housing in a distance from said cover part.

3. The gas bag module of claim 2, wherein said swivel axis extends in a distance from said cover part which, measured in a direction parallel to a direction in which said cover part swivels, corresponds at least to the width of said cover part.

4. The gas bag module of claim 2, wherein said swiveling part is constructed as a swivel plate on which said cover part is fastened.

5. The gas bag module of claim 1, wherein said cover consists of a single cover part.

6. The gas bag module of claim 1, wherein said cover consists of two cover parts which lie against each other in said closed position.

7. The gas bag module of claim 2, wherein said swiveling part extends outside said housing.

8. The gas bag module of claim 7, having an elongated form, said swiveling part extending along a longitudinal side of said housing.

9. The gas bag module of claim 2, wherein two swivel plates are provided, said swivel plates lying opposite each other and extending along the longitudinal sides of said housing.

10. The gas bag module of claim 8, wherein said swivel axis extends parallel to the longitudinal axis of said housing.

11. The gas bag module of claim 1, wherein said swivel axis extends in a central plane of said housing.

12. The gas bag module of claim 1, wherein said swivel axis extends in the region of a base of said housing.

13. The gas bag module of claim 1, wherein said cover part is provided with a sloping face on its outer edge running parallel to said swivel axis, so that despite a flush arrangement with a vehicle panel surrounding said gas bag module in a mounted condition, it can retract beneath the vehicle panel on opening.

* * * * *